United States Patent [19]

Whitaker et al.

[11] 4,296,409

[45] Oct. 20, 1981

[54] COMBINE PERFORMANCE MONITOR

[75] Inventors: Roger B. Whitaker, Crystal Lake; Charles W. Blevins, Auburn, both of Ill.

[73] Assignee: Dickey-john Corporation, Auburn, Ill.

[21] Appl. No.: 19,287

[22] Filed: Mar. 12, 1979

[51] Int. Cl.[3] .................... A01D 41/00; G06C 29/00; G08B 19/00

[52] U.S. Cl. .................................... 340/684; 56/10.2; 340/52 F; 340/521; 364/424; 364/551; 364/580

[58] Field of Search ............ 340/684, 517, 521, 52 F; 364/424, 431, 478, 551, 579, 580; 56/10.2, DIG. 15

[56] References Cited

U.S. PATENT DOCUMENTS

| | | | |
|---|---|---|---|
| 3,583,405 | 6/1971 | Gerhardt et al. | 340/684 X |
| 3,626,402 | 12/1971 | Price | 340/684 X |
| 3,739,367 | 6/1973 | Fathauer | 340/658 |
| 3,906,437 | 9/1975 | Brandwein et al. | 364/579 X |
| 3,935,866 | 2/1976 | Northup et al. | 56/DIG. 15 X |
| 3,988,577 | 10/1976 | Leitner et al. | 340/517 X |
| 4,068,223 | 1/1978 | Steffen | 340/684 X |
| 4,130,980 | 12/1978 | Fardal et al. | 56/10.2 |
| 4,188,618 | 2/1980 | Weisbart | 364/424 |

*Primary Examiner*—John W. Caldwell, Sr.
*Assistant Examiner*—Joseph E. Nowicki
*Attorney, Agent, or Firm*—Trexler, Bushnell & Wolters, Ltd.

[57] ABSTRACT

A combine performance monitor includes a programmed, special purpose computer coupled to a plurality of sensors for detecting a plurality of different operating conditions in a combine. The special purpose computer cooperates with operator accessible controls for calculating a plurality of predetermined performance parameters of the combine in accordance with signals from the sensors. The computer is further responsive to actuation of the controls by the operator for modifying the program so as to customize the combine performance monitor for operation with any combine selected, for operation with the particular sensors utilized in that combine selected and for operation of the selected sensors and combine in harvesting a particular grain.

18 Claims, 7 Drawing Figures

COMBINE PERFORMANCE MONITOR

BACKGROUND OF THE INVENTION

This invention relates to a novel system for monitoring the operation of a plurality of compoents of a harvesting machine such as a combine. More particularly, the invention is concerned with apparatus for continuous monitoring and measurement of the operation of various parts of the combine within predetermined desired operating parameters and providing suitable observable indications thereof to an operator to insure an efficient harvesting operation.

In modern harvesting machinery such as combines, the useful crop is separated from the other parts of the plant as the machine moves over the field to be harvested. The combine may be either a self-propelled type or one that is pulled behind a tractor, utilizing a conventional power take off from the tractor to power its harvesting machinery. Briefly, such combines generally mow or cut down the plants as the machine is propelled over the field to be harvested, whereupon the stalks are fed by suitable conveyors to a threshing apparatus where initial separation of the grains from the plants takes place. The grains remaining on the plants after threshing are further separated out on a straw shaker or walker, the grain generally falling through screens to a cleaning shoe. At the shoe further screens are generally provided in conjunction with a fan which blows away the chaff while the useful grain falls through. Conveyors are provided for carrying the useful, cleaned grain to a storage bin on the harvesting machine, while the remaining straw, chaff and the like exits the machine at the rear.

In such a combine apparatus there are a plurality of rotating shafts, as well as other drive parts for the structures which carry out the foregoing operations. It is important to monitor for proper operating speeds of these shafts and other moving parts to insure an efficient harvesting operation of the combine. In particular, it is known that the ground speed of the combine and the operating rates of the structures for mowing, threshing, separating and cleaning and the cooperating conveyors should be held at predetermined rates, both individually and relative to each other, to maximize the amount of grain separated from the plants and minimize loss of grain with the threshed out straw, chaff, and the like exiting the machine at the conclusion of the threshing and cleaning operation.

Various apparatus for monitoring the operation of such combines has been proposed in the past, specific examples being shown in the following U.S. Pat. Nos. 3,515,144 to Morrison, 3,583,405 to Gerhardt; 3,610,252 to DeCoene et al; 3,638,659 to Dahlquist et al., and 3,797,502 to Reed et al. While useful for their disclosed functions, many of the monitoring devices disclosed in the foregoing patents fail to provide for monitoring of all of the important structures of the combine apparatus. Moreover, many of these patents fail to recognize the importance of maintaining certain predetermined ratios between the relative speeds of various shafts in the combine machine, to insure peak efficiency of the harvesting operation, that is, a minimal amount of grain loss.

Significantly, combine monitoring systems heretofore known have been specifically designed for use with a particular make and model of combine machine. This has been necessary, since different combine machines incorporate different sizes and proportions of moving parts, having different rotational speeds and rates of movement. Moreover, the points available for mounting of suitable sensor devices differ widely among different combine machines. Accordingly, it will be seen that different types of sensors producing widely varying signal types or levels, may be utilized on different combines. Thus, it has been the practice in the past to specifically design a monitoring system, including sensors, monitoring circuitry and display devices, for use with a specific combine machine, such that the monitoring system is not readily adaptable to use on a different combine machine without substantial modification and adjustment. Further somewhat different parameters of operation, relative speeds of shafts, and the like are required of the combine for harvesting different grains. Thus, known monitoring systems have generally required substantial modification and adjustment when changing over for harvesting another type of grain.

Advantageously, the present invention provides a novel and improved combine performance monitor which is capable of rapidly and easily being customized for use with any selected combine machine, with the particular sensors utilized on that combine, and for rapid changeover for harvesting any one of a plurality of grains. The novel combine performance monitor of the invention is thus suitable for use with a broad variety of different makes and models of combine machines, the customizing of the monitoring apparatus for use with a selected machine being readily accomplished even by relatively unskilled personnel. In this regard, the combine performance monitor of this invention may be customized by the equipment dealer for installation on a combine prior to sale, or may be separately purchased by the former and readily customized by the dealer or by the farmer himself for use with his combine.

OBJECTS AND SUMMARY OF THE INVENTION

Accordingly, it is an object of this invention to provide a novel and improved combine performance monitor capable of providing observable indications to the operator of the continued proper operation of a plurality of parts of the combine, as the operator remains seated on the tractor, or in the cab of a self-propelled combine.

Another object of this invention is to provide a novel and improved combine performance monitor in accordance with the foregoing object which comprises a single monitor apparatus readily customizable for use with any of a broad variety of combine makes and models.

It is another object to provide a combine performance monitor in accordance with the foregoing objects wherein the customizing of the monitor for operation with a particular combine and for harvesting a particular grain may be readily accomplished by the farmer or farm equipment dealer, requiring no specialized skills.

A further object is to provide a novel and improved combine performance monitor in accordance with the foregoing object which is rugged and highly reliable in operation and yet relatively simple and inexpensive in its manufacture.

Briefly, in accordance with the foregoing objects, the combine performance monitor of the invention, for use with a combine having a plurality of sensor means for detecting a plurality of different operating conditions of the combine and for providing sensor signals corresponding to said conditions, comprises display means, operator accessible control and selection means and a programmable, special purpose computer including means for storing a predetermined computer program, said computer being coupled to said sensor means, to said control and selection means and to said display means for calculating a plurality of predetermined combine performance parameters in accordance with said sensor signals and with said predetermined program and for selectively energizing said display means to provide observable indications of said predetermined parameters in response to operator accessible control and selection means.

BRIEF DESCRIPTION OF THE DRAWINGS

Other objects, features and advantages of the present invention will be more readily appreciated upon consideration of the following detailed description of the illustrated embodiment, together with the accompanying figures of drawings, wherein.

DETAILED DESCRIPTION OF THE ILLUSTRATED EMBODIMENT

Figure 1:
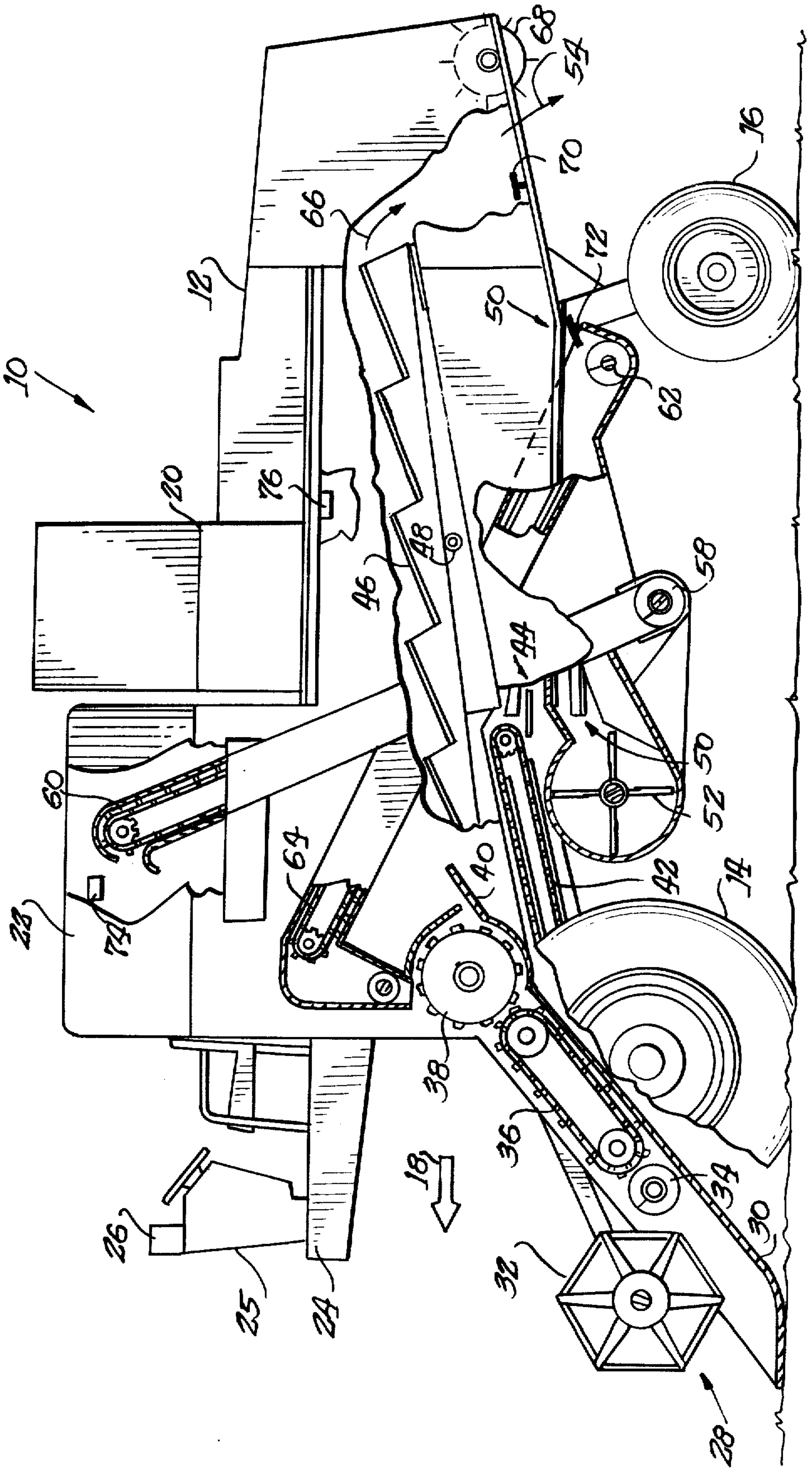
FIG. 1 is a side elevation, partially broken away and partially in schematic form, of a combine machine, with which the novel monitoring apparatus of the present invention may be advantageously utilized.

Turning now to the drawings, and initially to FIG. 1, a typical combine machine 10 of the self-propelld type is illustrated. Other types of combines are known in the art, for example, combines which are pulled behind a tractor with a suitable power take-off. The invention will be readily understood from the following description to be readily applicable to either type of combine machine. Moreover, the specific structures of the combine 10 to be hereinafter described may vary somewhat in their properties or arrangement on different combine machines, the present disclosure being of an exemplary or "typical" combine machine.

Advantageously, the monitoring system of the invention may readily be customized for use with any of a broad variety of combine machines, as will be discussed later herein. Accordingly, the illustrated combine 10 is utilized herein primarily to facilitate discussion of the functions to be monitored in accordance with the invention.

In accordance with conventional construction, the combine 10 includes apparatus for mowing, threshing and cleaning, in a combined operation as the combine passes over the field to be harvested. Generally, the combine includes a main frame or body 12 carried on a pair of forward drive wheels 14 and a pair of steerable rear wheels 16. In the following description, the terms forward and rearward are used in reference to the direction of machine travel as indicated generally by arrow 18. Similarly, terms such as upper and lower or fore and aft are used to describe relative directions or locations with respect to the combine 10 and are not intended to limit the invention in any way.

An engine 20 is mounted generally in the top portion of the body 12 and a grain tank or storage bin 22 is disposed on the body 12 generally in front of the engine 20. An operator's station 24 is mounted at the upper forward portion of the body 12 generally in front of the grain tank or storage bin 22. This operator's station 24 includes conventional controls 25 for the operation of the combine 10. A selection, control and display panel (shown in FIG. 3) is mounted in a housing 26 and forms a part of the monitoring system of the present invention. The housing 26 is mounted for convenient observation by the operator in the operator's station 24.

Referring again to the combine 10, other conventional features include a forwardly disposed header or harvesting platform designated generally 28 which generally includes a mowing board 30, above which is fitted a reel 32 which propels the mowed crop rearwardly into a transversely monted auger 34. The auger 34 carries the mowed crop to the base of a conveyor 36 which carries the crop upwardly and rearwardly to a threshing drum, cylinder or beater 38. This threshing drum 38 detaches grain from the crop by its threshing action in cooperation with a concave 40. Most of the grain is separated from the crop residue by the threshing cylinder 38 and concave 40 and falls through the concave 40 onto a separator conveyor 42 which feeds the separated grain to a cleaning apparatus or shoe, designated generally 44.

At the same time, the residue material from the threshing cylinder 40, including remaining unseparated grain, is propelled rearwardly onto a conventionl straw walker 46. Conventionally, the straw walker 46 comprises a plurality of fore-and-aft extending straw walkers which are mounted in the combine 12 in a side-by-side relationship and reciprocate in a fore-and-aft direction. A suitable crank shaft 48 drives the straw walkers 46 in this fore-and-aft motion. The straw walkers 46 generally have a corrugated or like bottom provided with a large number of apertures or openings (not shown). Thus, as the walkers reciprocate the crop material is carried rearwardly over their surfaces while grain separated therefrom falls through the apertures and either into the conveyor 42 or directly onto the cleaning apparatus or shoe 44.

The cleaning apparatus or shoe 44 generally includes one or more chaffers or sieves designated generally 50 which are reciprocated in a fore-and-aft motion, similar to that of the straw walkers 46, propelled by suitable drive components (not shown). The grain and chaff falling on the cleaning shoe 44 is subjected to a blast of air from a fan 52, which acts to carry the chaff outwardly of the combine body 12, as generally indicated by arrow 54. The grain thus separated and cleaned drops downwardly through the sieves or chaffers 50 where it is carried by a suitable auger conveyor 58 to an elevator 60. The elevator 60 delivers the clean grain upwardly to the storage bin or hopper 22. The remaining unseparated grain and crop residue is carried rearwardly of the chaffer or seive 50 where it falls downwardly to a transverse auger 62 which delivers the material to a tailings elevator 64. The tailings elevator 64 delivers the material forwardly and upwardly, discharging the tailings into the thresher 38 for rethreshing. Remaining straw and residue material from the straw walker 46 is discharged rearwardly and outwardly as generally indicated by arrows 66 and 54 to exit the rear of the combine 10. A straw chopper or spreader mechanism 68 may also be provided for chopping and spreading the discharge material.

Also in accordance with conventional practice, one or more temperature sensors and pressure sensors (not shown) may be associated with the engine 20. Additionally, tachometer or rotation sensors (not shown) are provided for drive shafts or other rotating drive components for the moving parts thus far mentioned. Suitable limit switches or sensors 74 and 76 are also provided for detecting the level of grain in the storage bin 22, and for detecting the level of crop material deposited above the straw walkers 48, respectively. Monitoring this latter level of material is of importance in preventing clogging of the material in the housing 12 which may occur if the combine 10 is being propelled too rapidly over the field to be harvested. Similar limit switches or sensors may be provided for monitoring other conditions, such as the position of the header 28, up for transport or down for harvesting, the condition of the chopper or spreader 68, on or off and other similar, two state functions.

Other conventional sensing apparatus includes a pair of grain loss sensors of known construction, one such sensor 70 being positioned rearwardly of the straw walkers 48 and another sensor 72 being positioned rearwardly of the cleaning shoe 44. The structure and function of these latter grain loss sensors, as well as the theory of operation thereof in estimating grain loss, is more fully set forth in the paper "Combine-Harvester Grain Loss Monitor" by W. B. Reed et al, paper No. 68-607 presented at the 1968 winter meeting of the American Society of Argicultural Engineers, Dec. 10-13, 1968. Suffice it to say, that these sensors comprise pressure sensitive transducers or impact sensors, such that grain falling thereon will produce a detectable pulse signal. Under normal harvesting conditions in cereal crops, the loss of grain in the harvesting operation may be estimated to a relatively high degree of accuracy by monitoring the grain exiting the walker and/or shoe in this fashion. Thus, a definite correlation exists between the amount of grain detected at the end of the walker 46 and the end of the shoe 44 with the grain loss of the combine 10 as a whole.

Figure 2:
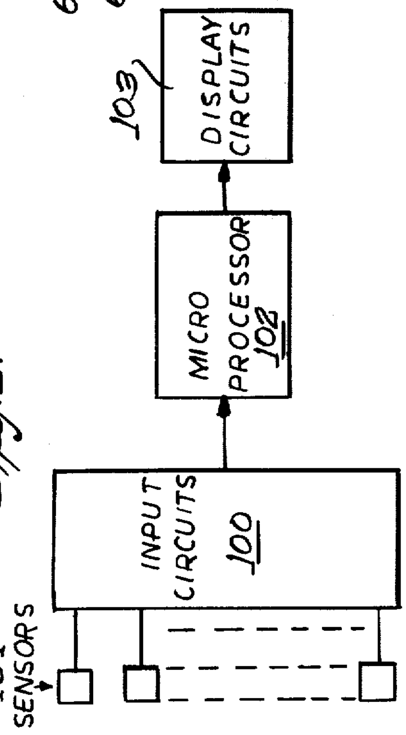
FIG. 2 is a circuit diagram, in block schematic form, showing functional blocks of the novel monitoring system of the invention.

The foregoing represents conventional combine construction together with a representative arrangement of sensors for monitoring the operation of the various structures therein. Referring to FIG. 2, the present invention includes a novel monitoring apparatus including input circuits 100, which receive the inputs from the sensors described above, designated here generally by reference numeral 101. These input circuits 100 feed suitable input signals to a programmabls, special purpose computer or microprocessor 102, which operates in accordance with a predetermined program, to process this information for display to the operator of suitable combine operating parameters to assure the operator of the continued proper functioning of the combine 10. The microprocessor 102 feeds display driver circuits 103 which actuate a control and display panel 104, shown in FIG. 3.

Figure 3:
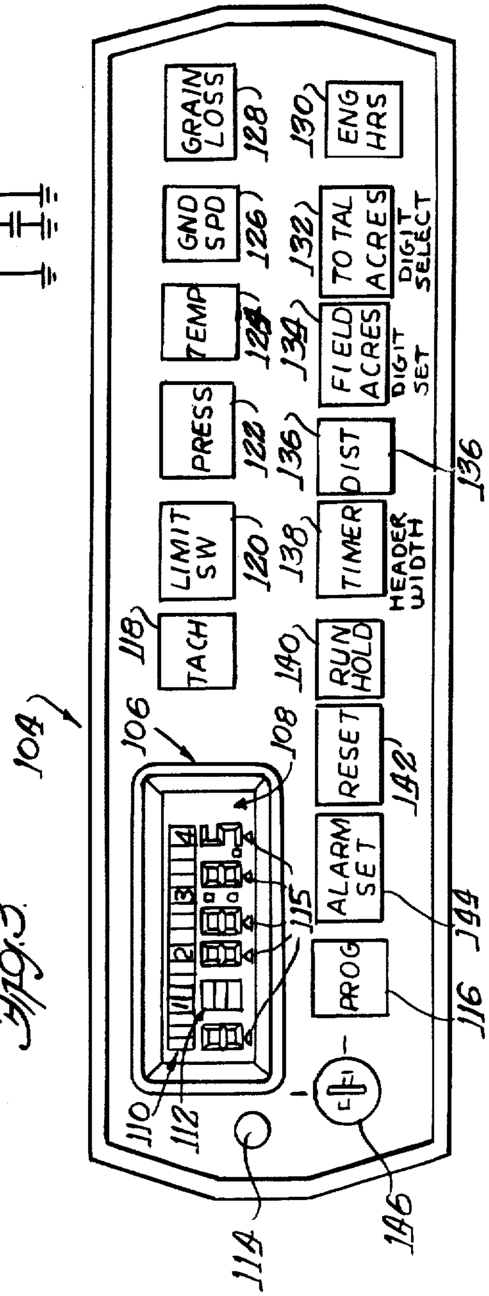
FIG. 3 is a front elevational view of an exemplary display and control panel for the monitoring apparatus of the invention.

Referring now to FIG. 3, the control and display panel 104 includes a display section 106 and fifteen control switches or keys, designated 116 thru 144 inclusive, which are individually back-lighted to indicate various operations as will be more fully detailed hereinbelow. Other elements include an audible alarm 114 and a key-operated control switch 146. Briefly, the display 106 comprises a liquid crystal display (LCD) panel including five, seven-segment digit characters designated generally 108 with associated decimal point and colon LCD characters, and an LED segmented bar graph designated generally 110. The control switches 116-144 are push-buttons, each bearing suitable indicia of the function associated therewith. The display 106 also includes liquid crystal message panels or annunciators 112 and an LED cursor or pointer 115 associated with each digit 108.

In order that the operation of the present invention may be more fully understood, a description thereof with reference to the block diagram of FIG. 2 and to the display and control panel 104 of FIG. 3 follows. The structure of the input circuits 100, and microprocessor 102 and associated circuit components are illustrated in FIGS. 4 through 7 and will be described hereinafter.

The seven-segment digit characters 108 are hereinafter referred to as first, second, etc., as viewed from right to left in FIG. 3. In the illustrated embodiment, the bar graph 110 includes 16 LED segments, for indicating grain loss on a relative scale of 0 through 4, every fourth segment bearing one of the digits 1 through 4, as viewed from left to right in FIG. 3.

The first thru fourth digits 108 display process data from the microprocessor 102, in accordance with the input from the sensors 101, via the input circuits 100. The message panels or annunciators 112 are marked with the legends RE PROG, OUT OF LIMITS and STOP, respectively. The RE PROG annunciator is lighted or energized to indicate an incorrect attempted operation of the control console 104. The OUT OF LIMITS annunciator is energized when an attempt is made to operate the microprocessor 102 outside of its programmed capacity or whenever the number displayed on the digits 108 is outside of the selected limits for the associated function. The STOP annunciator is energized when the combine 10 has been turned off, in response to predetermined unacceptable operating conditions thereof as detected by the sensors 101 and microprocessor 102. The control keys 116-144 will hereinafter be referred to by the function legends appearing thereon, three of the keys having dual functions as indicated by the legends illustrated therewith in FIG. 3.

Depression of any of the keys 116-144 will cause the key to be back lighted by a suitable associated lamp.

Depression of the TACH key 118 causes selection of one of the tachometer sensors associated with one of the rotating drive shafts of the combine 10 to be monitored. The fifth digit 108 will give a numerical identification of the particular tachometer or rotation sensor selected. Repeated depression of the TACH key will cause selection of consecutively number tachometer or rotation sensors as indicated by the left-most digit 108.

Depression of the LIMIT SW key 120 results in selection of one of the limit switches or sensors, as identified the fifty or left-most digit 108. These limit switches or sensors, such as the level sensors 74 and 76, generally produce either a 1 or 0 logic signal indicating that the selected switch is open or closed. These limit switch sensors may be of the normally opened or normally closed variety, responding to the associated level or other condition monitored thereby being at or above a given level or being below the selected level.

The pressure (PRESS) key 122 and temperature (TEMP) key 124 are depressed to individually select, as indicated by the fifth digit 108, the respective temperature and pressure sensors associated with the engine 20. The ground speed (GND SPD) key 126 causes the first through fourth display digits 108 to give the ground speed of the combine 10. Depression of the GRAIN LOSS key allows selection of one or both of the sensors 70 and 72 associated with the walker and shoe, a one "1" displayed in the fifth digit 108 indicating both walker and shoe sensors, a two "2" indicating walker only and a three "3" indicating shoe only. The bar graph 110 then displays the amount of grain loss relative to a preselected level. This preselected level is chosen to correspond to energization of the first four of the bar graph segments (i.e., up to and including the segment labeled "1"). The bar graph 110 produces a continuous indication of relative grain loss in this fashion, without regard for the other selected functions being displayed on the first through fourth digits 108.

Depression of the program (PROG) key 116 causes the console 104 and microprocessor 102 to enter into a programming mode, as will be discussed below, and enables the DIGIT SET and DIGIT SELECT functions of the keys 132 and 134. The FIELD ACRES and TOTAL ACRES functions of the keys 132 and 134 cause the acres accumulated in a pair of acre counters to be displayed in the first through fourth digits 108. For example, one such counter may be used to count the total acres harvested in a given field while the other is used to accumulate the total acres harvested over a season. Depression of the engine hours (ENG HRS) key 130 causes the first through fourth display digits 108 to display the accumulated hours of operation of the engine 20 of the combine 10.

Depression of the TIMER key 138 allows interval timing up to 99 minutes 59 seconds, as indicated by the first through fourth digits 108 and the colon character, of any function the operator may wish to time. This key 138 is also used when in the program mode (i.e., program key 116 depressed) to set in the header width of the particular combine with which the monitor is being used, as will be described later.

The distance (DIST) key 136 allows the first through fourth digits 108 to display a running distance measurement of up to 9,999 feet. The RUN/HOLD key 140 is used with the FIELD ACRES, TIMER and DIST keys to start and stop the accumulation of the associated functions.

The ALARM SET key 144 causes entry of the consoele 104 and microprocessor 102 into the alarm setting mode, which will be discussed later. The RESET key 14 is depressed and held for 3 seconds to return the total acres, field acres, timer, distance and engine hours counts to zero, and to reset the audible alarm 114. This audible alarm is sounded in response to selected out-of-limits or alarm conditions as detected by various sensors 101 and determined by the microprocessor 102, as will be described below.

In accordance with an important feature of this invention, the monitor may be simply and readily customized by the farm equipment dealer or by the farmer for use with a particular combine. This customizing is accomplished by operation of the controls of the control and display panel 104. This customizing operation accomplishes a customization or a modification of the program contained in a memory portion of the microprocessor 102, to adapt the microprocessor 102 and hence the entire monitoring system for operation with the particular combine with which it is to be utilized. This customizing feature will be referred to herein as three level customizing and is accomplished as follows.

In the first level or level one of customizing, the operator enters constants corresponding to the characteristics of the combine 10 and to the sensors selected for use therewith. The microprocessor 102 is programmed for response to operator actuation of the keys 116 through 144 of the control panel 104 for entering suitable constants to modify or customize the program for operation with the selected combine and sensors. Advantageously, this operation may be readily carried out by relatively simple operation of the keys 116-144 and observation of the display 106, requiring no specialized skills or training.

Each tachometer or rotation sensor and its associated rotating structure is selected for the customizing process by depressing the program (PROG) key 116 and TACH key 118. The fifth digit 108 will indicate the number 1 for the first tachometer rotation sensor which is generally that associated with a drive shaft for the beater or threshing cylinder 38. Successive depression of TACH key 118 will cause selection of subsequently numbered tachometer sensors. For the first three tachometers to be monitored, the first through third digits 108 are selected and advanced by operation of the DIGIT SELECT key 132 and DIGIT SET key 134, to indicate the number of sensor pulses received from each tachometer or rotation sensor per revolution of its associated shaft or other rotating component. The cursor 115 assocciated with each digit 108 will be lighted as its associated digit is selected for setting. Customizing for the remaining tachometer sensors is done later, as explained below. For the first three tachometer or rotation sensors, the fourth digit is set to a one, thereby providing a predetermined division ratio in the input circuits 100 of the pulses received from the associated sensor. For the remaining tachometer sensors, a zero is selected at the fourth digit 108 for inputting the associated sensor pulses directly into the microprocessor 102. In the illustrated embodiment this set dividing ratio is a divide-by-16, to accommodate sensors with a relatively high number of pulses per revolution output.

Depression of the GRAIN LOSS key 128 while the program key 116 is still activated sets the cursor 115 at the first digit 108. The DIGIT SET key 134 is then utilized to set this digit to a one, two or three. This corresponds to selection of a particular grain which is to be harvested, the three settings or groups of constants selected in this process each being contained in the program and representing suitable constants for the harvesting of one of a number of similar grains by the combine 10.

The limit sensor or limit switches are selected for customizing by depression of the LIMIT SW key 120 while the program (PROG) key 116 is still activated. The cursor 115 again will be set at the first digit 108, whereupon the DIGIT SET key 134 is depressed to set this digit at a one or zero. A one indicates that the selected limit switch or sensor is of the normally closed variety while a zero indicates that the selected limit switch or sensor is of the normally open variety. The fifth digit 108 indicates which of the limit switches or sensors is currently being selected for setting of this constant.

Depression of the TOTAL ACRES key 132 followed by depression of the program (PROG) key 116 causes the first four digits 108 to be available for setting in a constant corresponding to the header width of the combine 10. The DIGIT SELECT and DIGIT SET keys 132 and 134 may then be used to set the first four digits 108 to the header width in inches.

Depression of the distance (DIST) key 136 followed by depression of the program (PROG) key 116 and RESET key 147 allows customizing for the particular ground speed sensor utilized. Two methods may be used to select and set into the program an appropriate constant. This constant corresponds to the number of pulses generated by the particular sensor used per unit distance traveled by the combine 10. In the first method, if the number of pulses for the sensor utilized produced per 0.1 miles distance traveled by the combine 10 is known, for example from manufacturer's instructions or from previous use of the same sensor on the same combine, the number may be set in directly by use of the DIGIT SELECT and DIGIT SET keys 132 and 134. If this number is not known, the combine may be driven over a premeasured distance of 0.1 miles (528 feet) and the first through fourth display digits 108 will accumulate the sensor pulses. At the end of travel of this measured distance, the distance (DIST) key 136 is depressed to enter the accumulated count into the microprocessor 102.

The monitor is customized for use with the particular pressure and temperature sensors utilized by depression of the temperature (TEMP) key 124 or pressure (PRESS) key 122, respectively, followed by depression of the program (PROG) key 116. Only the first digit 108 is utilized to set in a code number corresponding to the response characteristics of the particular type of sensor, either temperature or pressure, being utilized. The code number corresponds to the selection of one of a plurality of sets of temperature or pressure response constants contained in the program. The fifth or left-most digit 108 will indicate the identity of the particular one of the plural temperature and pressure sensors being customized for each successive depression of the temperature or pressure key. This completes the first level or level one of customizing of the monitor apparatus of this invention.

In the second level or level two customizing operation, suitable constants are entered in similar fashion to the simple procedure utilized in the first level as set forth above. The level two constants correspond to the points at which the alarm 114 is to be actuated during operation of the combine, thereby indicating the corresponding sensed and measured values are outside the acceptable limits of operation. Each function to be customized in this level of the customizing operation is selected by depression of its associated key 116–144, followed by depression of the ALARM SET key 144 and program (PROG) key 116, respectively.

The first three of the tachometer or rotation sensors are selected for customizing at this level by depressing the TACH key 118, whereupon the fifth digit 108 indicates the particular sensor selected for setting of its alarm point. The remaining four digits are then set, in a similar manner as described above, by the digit select and digit set keys 132, 134 to indicate the amount of plus or minus allowable variation, in RPMs, from the nominal speed of the associated sensor at which the alarm is to be activated. This nominal RPM speed is customized in the third level of customizing, to be described hereinbelow. The remaining tachometer or rotation sensors (up to 5 additional such sensors may be accommodated in the illustrated embodiment) are selected for customizing by subsequent depressions of the TACH key 118, to cause the fifth digit 108 to indicate or identify each of these sensors by number. The ALARM SET key 144 and program (PROG) key 116 are successively depressed, whereupon the first and second digits 108 are set in the normal fashion by the digit set and digit select keys 132, 134 to set in the plus or minus percent of allowable variation in the ratio of the selected tachometer RPMs to the nominal RPM value of tachometer sensor number 1. Again, the nominal value of the first tachometer sensor and the desired ratio of each of these tachometer sensors thereto is customized in the third level of customizing operation, as will be set forth hereinbelow.

Depression of the ground speed (GND SPD) key 126, followed in succession by depression of the ALARM SET key 144 and program (PROG) key 116, allows customizing of the alarm point for the ground speed sensor. The first through third digits 108 are programmed by the digit select and digit set keys 132, 134 for the maximum desired ground speed to the nearest 0.1 MPH.

Depression of the engine hours (ENG HRS) key 130, followed in succession by depression of the ALARM SET and PROG keys 144, 116 allows digits 1 through 4 to be programmed by the digit select and digit set keys 132, 134 to a value corresponding to the number of hours of engine operation at which an alarm is to be given. Generally, this acts as a reminder to the operator of the number of hours of operation of the combine 10 at which periodic maintenance and servicing activities should be carried out.

The grain loss alarm point is not customized in the illustrated embodiment but rather the point at which the alarm is given is fixed at the number two indication of the segmented bar graph 110 which is the eighth segment thereof. This corresponds to a grain loss level of twice the desired level, which is set at the segment number 1 (fourth segment) of bar graph 110, as will be described below in the third level of customizing.

In the level two customizing, each limit sensor is again selected by depression of the LIMIT SW key 120, followed by ALARM SET key 144 and program (PROG) key 116. The fifth digit 108 displays the selected sensor for each actuation of the limit key 120, while the first digit 108 is set to a one or zero by depression of the DIGIT SET key 134. Selection of a one indicates the alarm is enabled for that particular sensor while selection of a zero indicates the alarm is to be disabled for that particular sensor.

Alarm points for the temperature and pressure sensors are set by depression of the pressure (PRESS) key 122 or temperature (TEMP) key 124, as desired, followed by depression of ALARM SET key 144 and PROG key 116. The fifth digit 108 now displays the selected sensor in each case, whereupon the desired alarm point in degrees fahrenheit for the temperature sensors or in pounds per square inch for pressure sensors, may be set, utilizing the digit select and digit set keys 132, 134, in normal fashion. This completes the second level or level two customizing operation.

The third and final level of the customizing operation comprises customizing the monitor of the invention for the nominal operating value of the function associated with each sensor. With the combine running, the tachometer or rotation sensors are selected in normal fashion by successive depressions of the TACH key 118, to display the number of the selected sensor in the fifth digit 108. This is followed by successive depression of the ALARM SET key 144 and the RESET key 142, the latter being held in for approximately 3 seconds. The RPM rate detected by the number 1 tachometer will automatically be set into the program. This first tachometer is generally the one associated with the beater or threshing cylinder 38. This RPM value is also displayed on the first four display digits 108, and is then utilized to ratio the number four through number eight tachometers, respectively as mentioned above in the level two customizing operation. The other, ie. number two and three, tachometer inputs are then selected in similar fashion for customizing in accordance with their nominal operating values.

With the combine still operating, an acceptable level of grain loss, as determined by the operator, is set in by depression of GRAIN LOSS key 128, followed in succession by depression of the ALARM SET key 144 and the rESET key 142, the latter being held for three seconds. This will cause the bar graph to give a reading of 1 (the first or left-most four segments of the segmented graph 110 being lighted). It should be recognized that the grain loss is in part dependent on the ground speed of the combine 10. Accordingly, a predetermined ratio of the frequency of signal from the grain loss sensors to the ground speed will be representative of the acceptable maximum level of grain loss. Thus, a ratio of frequency signal from the grain loss sensor or sensors to the ground speed sensor which is twice the nominal value set in this operation will cause the bar graph display 110 to read 2 (eight segments thereof lighted) and will activate the alarm 114. This completes the level three customizing operation of the monitor of the invention.

The operation of the alarm and engine shut-down capability in accordance with the present invention will now be briefly described. Any monitored function that is in an alarm condition, as customized in the level two and level three customizing operations described above, will cause the lamp of the associated function key to flash on and off at a preselected rate when the value for the sensor in this alarm condition is being displayed in the digits 108. In the illustrated embodiment, the flashing of the associated function key occurs at a 4 hertz rate, in this case. The message panel 112 indication OUT OF LIMITS will also be lighted in the display 106. If the sensor at which an alarm condition exists is not currently being displayed in the display 106, its associated function key lamp will flash at a greater rate, to call the operator's attention to the associated function. In the illustrated embodiment the rate of flashing in this latter case is substantially 8 hertz. In the case where more than one sensor is in an alarm condition, the display 106 will show the first such sensor monitored, in accordance with the sequence of operation of the monitor. This sequence of operation is in accordance with the predetermined program of the microprocessor 102. Alternatively, the operator may select a sensor for display by operation of the associated function key. Accordingly, the alarm function displayed on the display 106 will be the first sensor the microprocessor monitors either in its normal sequence of operation, or when selected by the operator, which shows an alarm condition. The audible alarm 114 will continue to sound until the RESET key 142 is depressed, whereupon the alarm will not sound again for that particular sensor until the condition causing the alarm has been corrected, or the operator recustomizes, by the procedure described above, to eliminate that sensor or to set a different alarm value for that sensor. If an alarm condition occurs at another sensor while the first alarm function is being displayed in the display 106, the value of the function at the new sensor will not be displayed until called for by depression of its associated function switch (which will flash as described above) by the operator.

In accordance with the preferred embodiment of the invention, the key operated switch 146 may be turned by use of a key to the position in dotted line in FIG. 3, which is called the shut-down position. With the switch 146 at this position, an alarm condition sensed at the number 1 temperature sensor or the number 1 pressure sensor will activate a suitable relay to turn off the combine engine 20. When this occurs, the message panel 112 will display the message STOP.

Having described the operation of the present invention, the details of the structure of the input circuits 100, the microprocessor 102 and the display circuits 103, together with a suitable power supply will now be described with reference to the remaining figures of the drawing.

Figure 4:
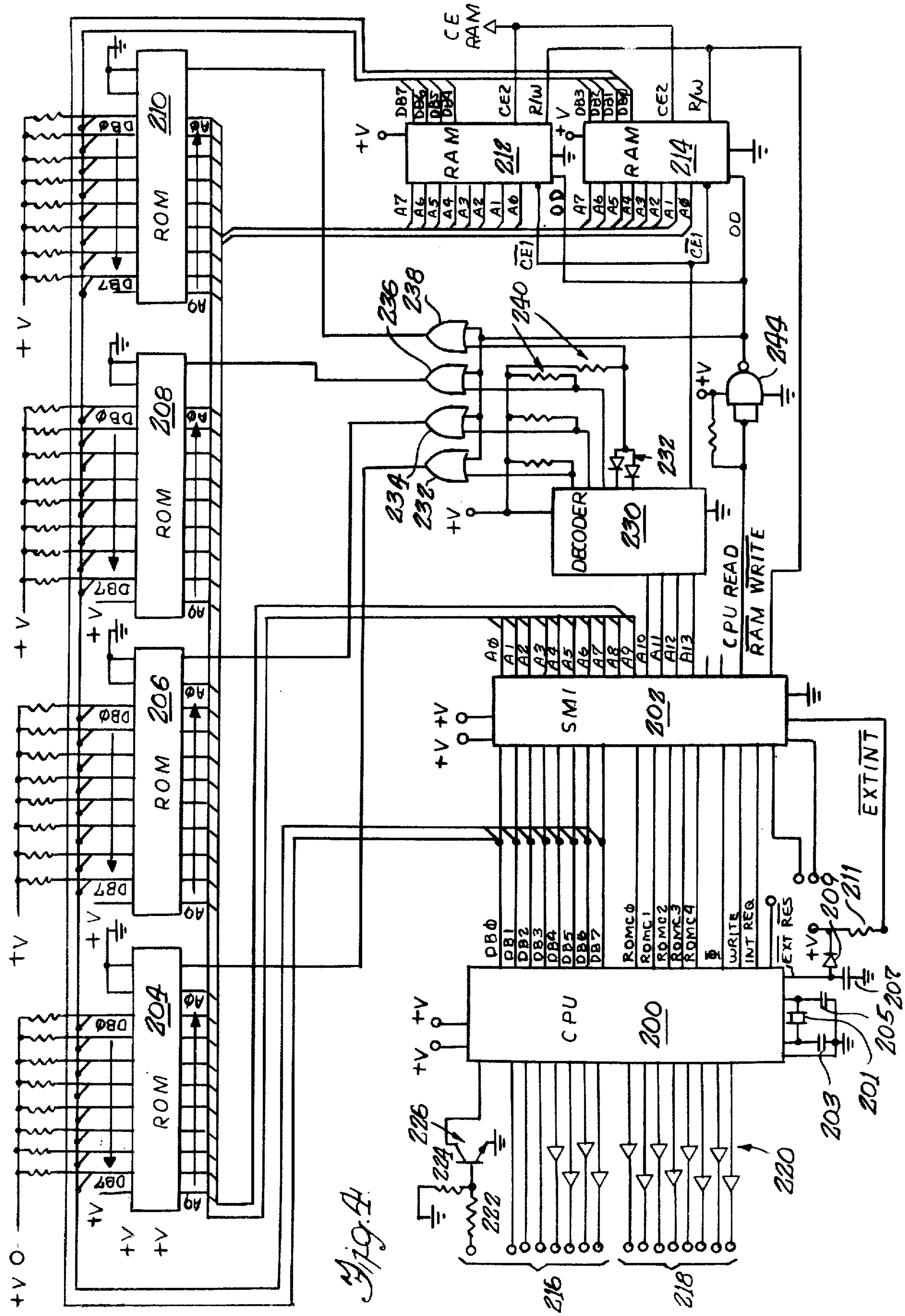
FIG. 4 is a circuit schematic of a portion of a monitoring circuit of the invention.

Referring now to FIG. 4, a portion of the microprocessor 102 of the invention is illustrated in detail. The microprocessor includes a central processing unit (CPU) 200, a static memory interface (SMI) 202, and a plurality of memory elements. In the illustrated embodiment, these memory elements comprise four ROM-type memories 204, 206, 208, and 210 and two RAM-type memories 212 and 214. In the illustrated embodiment the CPU 200 and SMI 202 are microprocessor components of the F8 family manufactured by Fairchild. The CPU 200 is a central processing unit of the type generally designated 3850 and the SMI 202 is a static memory interface of the type generally designated 3853. In the illustrated embodiment, the ROM's 204, 206 and 208 are all of the type generally designated 2708 ultraviolet erasable PROM, available for example from the Intel Company. The ROM 210, in the illustrated embodiment is a similar ultraviolet erasable PROM of the type generally designated 2716 and available from the Intel Company. The RAM's 212 and 214 are preferably of the type 5101.

The CPU 200 has a plurality of input/output (I/O) terminals, arranged in two eight-bit ports, generally designated 216 and 218. Suitable buffers, designated 220 are interposed in selected ones of the bits of the ports 216 and 218. In addition, the first I/O terminal of the port 216 includes a circuit comprising a pair of resistors 222 and 224 and a transistor 226 interfacing with the CPU 200. Control lines and data bus lines of the CPU 200 are indicated by the symbols generally used in the art which are more fully set forth and explained in the Fairchild publication "F8 Users Guide", publication number 67095665 of the Fairchild Camera and Instrument Corporation, copyright 1976, which is incorporated herein by reference. Clock timing control elements are provided for the CPU 200 in conventional fashion. These include a crystal element 201 and capacitors 203 and 205. The $\overline{\text{EXT}}$ $\overline{\text{RES}}$ line of the CPU 200 is provided with a capacitor 207 to ground and is joined to the $\overline{\text{EXT}}$ $\overline{\text{INT}}$ input of SMI 202 via a series connected diode 209 and resistor 211, whose junction receives a positive supply voltage. Data bus lines DBφ through DB7 are joined with like-designated data bus lines of the SMI 202 and of the memory units 204, 206, 208, 212 and 214, respectively, as indicated in FIG. 4. The SMI 202 feeds address lines Aϕ through A9 which are also joined with like-designated address inputs of the memory devices 204 through 214, inclusive, as indicated in FIG. 4. Additional address lines A10 through A13, inclusive are fed from the SMI 202 and are connected as memory select lines through a network comprising a BCD-to-decimal decoder 230 whose outputs feed one input of each of four-two-input OR gates 232, 234, 236 and 238. These outputs are each joined with a suitable pull-up resistor, designated generally 240. A pair of diodes, designated generally 242, are interposed between the decoder 230 and the first mentioned input of the OR gate 238. The CPU READ output of the SMI 202 feeds both inputs of a two input NAND GATE 244 whose output feeds the remaining inputs of all four OR gates 232, 234, 236 and 238. The output of NAND gate 244 also feeds the OD inputs of the RAM's 212 and 214. The remaining output of the decoder 230 feeds the $\overline{\text{CE 1}}$ inputs of RAM's 212 and 214, whose CE 2 inputs are fed from the power supply of FIG. 7, which will be discussed hereinbelow. The $\overline{\text{RAM WRITE}}$ output of the SMI 202 feeds R/W inputs of the RAM's 212 and 214. The designation of various input and output terminals of all of the foregoing devices are more fully explained in publications describing these devices which are generally available. In the illustrated embodiment, the decoder 230 comprises a BCD-to-decimal decoder of the type generally designated 74LS42.

Figure 5:
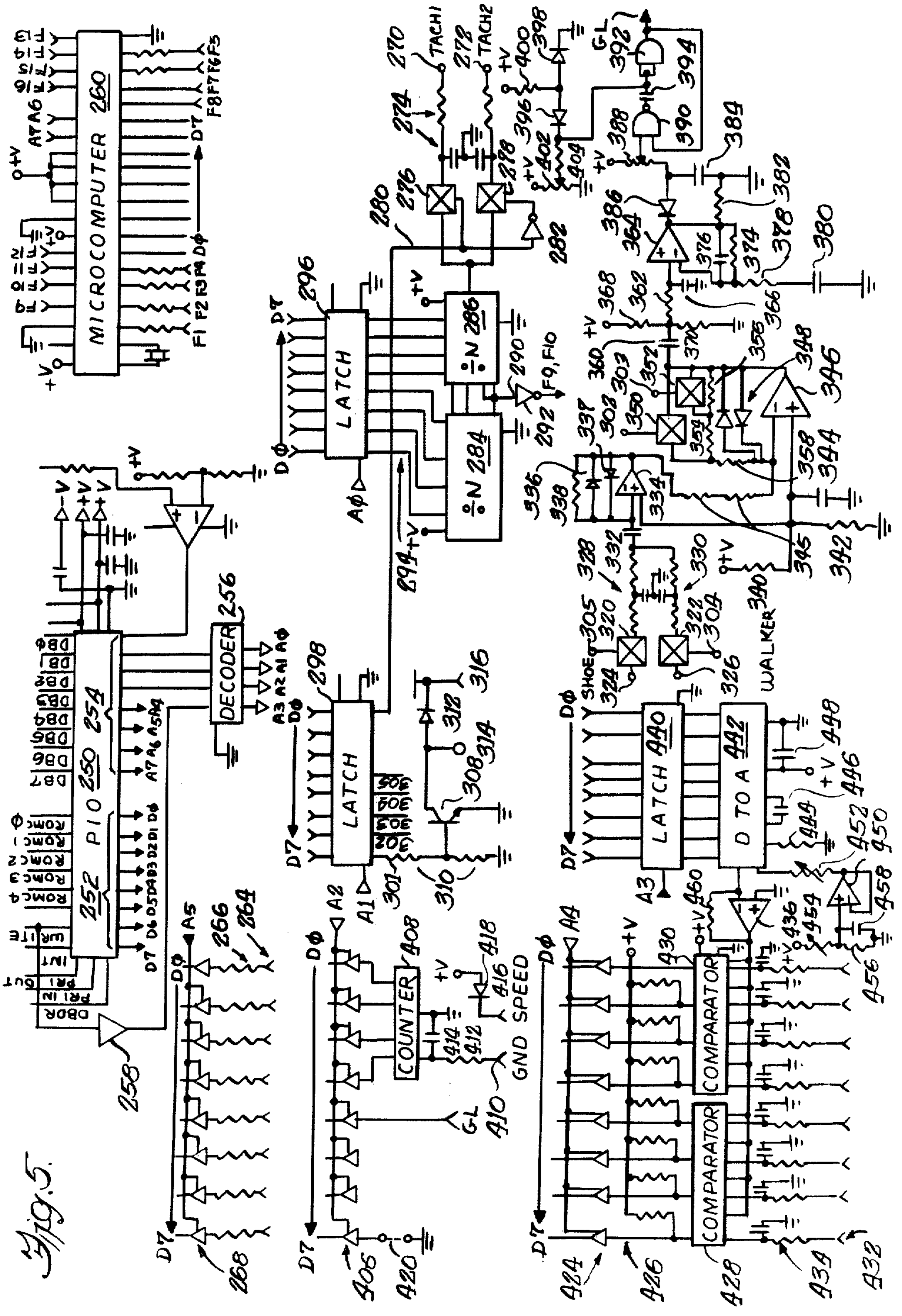
FIG. 5 is a circuit schematic of a further portion of the monitoring circuit of the invention.

Referring to FIG. 5, additional portions of the microprocessor 102, together with the input circuits 100 are illustrated in detail. A peripheral inut/output unit (PIO) 250, preferably is of the type generally designated 3861B, of the F8 microcomputer family manufactured by Fairchild, as mentioned above. The PIO 250 receives the data bus lines (DBϕ through DB 7) illustrated and described above with reference to FIG. 4, and the other control lines of the CPU 200, as described above and in the referenced Fairchild publication, and as indicated in the illustration thereof in FIG. 5.

The PIO 250 has a pair of eight-bit input/output (I/O) ports, designated generally 252 and 254. Eight I/O lines emanating from the port 252 are designated generally by reference characters Dϕ through D7, and are utilized as bi-directional data lines in the circuits illustrated in FIG. 5. Eight I/O lines emanating from the port 254 are utilized as address lines for the components of FIG. 5, and are designated generally Aϕ through A7. The A4 through A7 lines are fed directly from the bits of the port 254, while the Aϕ through A3 lines are fed from a decoder 256, which receives three of the remaining I/O bits of port 254 and the WRITE line of the PIO 250, via a suitable buffer 258.

The microprocessor 102 also including an additional microcomputer 260, which is joined with the PIO 250 via the data lines Dϕ through D7 of the port 252 and via the address lines A6 and A7 of the port 254. In the illustrated embodiment, the microcomputer 260 is of the type generally designated MK3870 and manufactured by Mostek. Input and output between the microcomputer 260 and the CPU 200 is handled by the PIO 250. The remaining components of FIG. 5, are arranged as suitable interfaces between the PIO and the sensors associated with the combine. Accordingly, the PIO 250 is adapted to address the various input and output interfaces with the sensors via its address port lines Aϕ through A7 and to exchange data (and provide for initial data processing for some of the sensors) via the bi-directional data lines Dϕ through D7 of the I/O port 252 thereof.

Specifically, the illustrated embodiment includes suitable inputs designated generally by the reference numeral 264, for up to eight limit switch-type sensors. These inputs (illustrated at the upper left portion of FIG. 5) are each joined to a suitable series resistor, designated generally 266, in series with one of a corresponding plurality of controllable buffer elements, designated generally 268. In the illustrated embodiment, the buffers 268 comprise elements of an integrated circuit package generally designated 74LS367, and are controlled from the address line A5 of the port 254 of the PIO 250.

The microcomputer 260 receives inputs from the tachometer or rotation sensors associated with the combine 10, as generally described above. The inputs of the microcomputer 260 labeled F1 through F16, inclusive, are each available to receive one such tachometer or rotation sensor input. Additionally, the tachometers designated one and two, which are generally associated with an engine RPM sensor, with a main power take off RPM sensor or with the threshing cylinder or beater RPM sensor, are fed to input terminals 270 and 272 also labeled as TACH 1 and TACH 2, at the right hand center portion of FIG. 5. These inputs are each fed through suitable RC networks generally designated 274 to a corresponding pair of bi-lateral switches 276 and 278. The bi-lateral switches 276 and 278 are selectively energizable via a control line 280 for passing a selected one of the inputs 270, 272 to the input of a divide-by-N circuit (÷N) comprising integrated circuit components 284 and 286. It will be noted that an inverter buffer 282 is interposed in the line between control line 280 and the bi-lateral switch 278, to insure that only one of these bi-lateral switches will allow its associated tachometer signal through to the divide-by-N network 284, 286, as selected by the control signal on line 280. The components 284 and 286 each comprise an integrated circuit of the type generally designated MC14526, which are programmable divide-by-N counters. The circuit arrangement illustrated in FIG. 5 programs these divide-by-N circuits 284 and 286 such that the circuit 284 represents the most significant digit of the divisor while the circuit 286 represents the least significant digit thereof. In the illustrated embodiment the divisor is chosen as 16.

The frequency output at circuit point 290 is fed through an inverter buffer 292 to the input terminals F9 and F10 of the microcomputer 260. Divider ratio select or programming lines designated generally 294, are in turn programmed in accordance with four bit digital signals delivered from a latch 296. The latch 296, in the illustrated embodiment, is an integrated circuit of the type generally designated 74C373, which is an eight-bit latch. This latch is fed data from the microcomputer via the PIO 250 on the lines Dϕ to D7 of the I/O port 252. The latch 296 is selectively addressed from the address line Aϕ of the port 254 of PIO 250. The control signal on line 280 is received from a similar latch 298 which is also preferably of type designated generally 74C373, and is also fed from the data lines Dϕ through D7 of the PIO 252.

This latter latch 298 is addressed selectively by the address line A1 from the decoder 256 associated with port 254 of the PIO 250. The remaining outputs of the latch 298 are numbered 301, 302, 303, 304 and 305, and control additional circuits in accordance with data received by the latch 298 from the data lines Dφ through D7.

Specifically, control line 301 drives the base of a transistor 308 via a voltage divider comprising a pair of suitable resistors designated generally 310. The emitter terminal of transistor 308 is grounded while the collector terminal thereof drives a shut-down relay (not shown) connected across a diode 312, at the terminals 314 and 316. It is this shut-down relay that causes a de-energization or shut-down of the engine 20 of combine 10 in response to selected pressure and temperature levels at the pressure and temperature sensors designated respectively with the identification number 1, as described above with reference to the operation of the monitor of this invention.

The output lines 302 through 305 of the latch 298 provide suitable on or off control signals, in accordance with the data received on lines Dφ through D7 to respective bi-lateral switches, as indicated in the lower, right of center, portion of FIG. 5. The lines 304 and 305 selectively control bi-lateral switches 320 and 322. These bi-lateral switches 320 and 322 receive inputs 324 and 326 from the grain loss sensor associated with the shoe and walker respectively. Accordingly, the shoe or walker sensors may be monitored individually or together, as selected in the customizing operation described previously. Each of the bi-lateral switches 320 and 322 feeds the associated grain loss signal, if selected, through a suitable RC circuit designated generally 328, 330 and through an additional capacitor 332 in series with the inverting input of an operational amplifier 334. The operational amplifier 334 is provided with a pair of parallel, oppositely facing diodes 336, 337 and a resistor 338 in parallel with the diodes 336, all joined as a feedback network between the output of OP AMP 334 and its inverting input. The noninverting input of OP AMP 334 is connected to the junction of a pair of resistors 340 and 342 in series between a positive voltage source and ground. This junction of resistors 340 and 342 is also provided with a suitable capacitor 344 running to ground, and feeds the noninverting input of a second operational amplifier 346 whose inverting input receives the output of OP AMP 334 via series resistors 345.

This latter OP AMP 346 is provided with a similar feedback network including a pair of parallel, oppositely facing diodes designated generally 348 running between its output and its inverting input. The gain of this latter operational amplifier is controlled by operation of a pair of bi-lateral switches 350 and 352, which are controlled from the previously described lines 302 and 303 of the latch 298. It will be seen that these bi-lateral switches 350 and 352 may be turned on and off independently or together to effectively connect or bypass resistors 354, 356 and 358 in the feedback loop of the OP AMP 346. The output of OP AMP 346 feeds a capacitor 360 and a resistor 362 in series circuit with the noninverting input of a further operational amplifier 364. A suitable capacitor 366 is connected between this noninverting input of OP AMP 364 and ground. A suitable DC potential is applied at the junction of capacitor 360 with resistor 362 from the junction of a pair of resistors 368 and 370 running between a suitable positive voltage source and ground. The OP AMP 364 is provided with a suitable feedback network between its output and its inverting input comprising the parallel combination of a resistor 374 with a capacitor 376. The inverting input of OP AMP 364 is also provided with the series combination of resistor 378 with capacitor 380 running therefrom to ground. The output of the OP AMP 364 is also provided with a resistor 382 running to ground. The output of OP AMP 364 feeds the cathode of a diode 386 whose anode feeds one side of a variable resistor 388 whose opposite side is joined to a suitable positive voltage supply. The anode of diode 386 also feeds a capacitor 384 running to ground. The center tap of variable resistor 388 feeds one input of a two input NAND gate 390 whose output feeds both inputs of a second NAND gate 392 through a series connected capacitor 394. The output of NAND gate 392 is fed back to the remaining input of NAND gate 390. The inputs to the NAND gate 392 are also held at a suitable voltage level by a network comprising a pair of series connected, back-to-back diodes 396 and 398, whose junction is fed from a suitable positive voltage supply via a series resistor 400. The cathode of diode 396 also receives a suitable biasing voltage through a resistor 404 from the center tap of a variable resistor 402 coupled between a suitable voltage supply and ground. The output of NAND gate 392 comprises the grain loss (GL) output signal of the signal processing system just described between the inputs 324 and 326 from the shoe and walker grain loss sensors and the output GL at the lower right hand portion of FIG. 5.

This output GL is also joined at the central left hand portion of the figure with an input to an interfacing network with the PIO 250, similar to the network associated with the addressing line A5 thereof. This network is addressed by the line A2 from the decoder 256, which is fed from the PIO 250. The I/O terminals Dφ through D7 are connected as shown to the outputs of a plurality of control buffer elements designated generally 406, which receive a control signal from the line A2. A counter integrated circuit 408 feeds four of these buffer elements 406 which in turn feed the Dφ through D3 terminals of the port 252 of PIO 250, respectively. This counter is preferably of the type designated 452OB, and is fed from a terminal 410 which is designated as the ground speed sensor input terminal in the case where a radar type of ground speed sensor is utilized. The terminal 410 is joined with the input terminal of counter 408 by a suitable RC network comprising resistor 412 and capacitor 414. A terminal 416 is provided for the opposite side of a radar ground speed sensor and also receives a suitable positive voltage via a series connected diode 418. The left-most of the buffers 406, which feeds the D7 terminal of port 252 in PIO 250 has provision for receiving a jumper 420 to ground feeding its input. This jumper 420, when utilized to join this input to ground, converts all measurements and computations in the system from English to metric system of measurement.

Referring now to the lower-left hand portion of FIG. 5, two additional networks are joined to the PIO 250 data port 252 and selectively addressed by the address lines A3 and A4, respectively, of the address port 254. The address line A4 feeds control terminals of a group of controllable buffers 424, which feed the I/O terminals Dφ through D7 of the port 252, as indicated. The inputs of these buffer elements 424 are provided with suitable pull-up resistors, designated generally 426, running to a positive voltage supply. The inputs of the buffers 424 are fed from respective outputs of a pair of comparator integrated circuits 428 and 430. In the illustrated embodiment, these comparators 428 and 430 comprise integrated circuit packages of the type generally designated LM319. Each of the comparators 428 and 430 has four pairs of compared inputs, the first of each of these four pairs being fed from one of the four temperature sensors, at terminals generally designated 432 via suitable series connected RC networks designated generally 434. The opposite compare inputs of the comparators 428 and 430 are fed from a common source comprising the output of an operational amplifier 436.

This operational amplifier 436 is part of a network receiving suitable data corresponding to the characteristics of each of the temperature and pressure sensors, as programmed in the microcomputer 102 and selected for each sensor during the customizing procedure described earlier herein. These values are received in digital form over the terminals Dϕ through D7, as indicated at the input of a latch circuit element 440, which is addressed to receive this data by the line A3 from PIO 250. The latch 440 feeds these inputs to a digital-to-analog converter circuit 442, which is provided with suitable external passive components including a resistor 444 to ground, a capacitor 446 joining selected control terminals thereof and a capacitor 448 running between a suitable voltage supply and ground and joined between further control terminals of digital-to-analog converter 442. In the illustrated embodiment, the latch 440 comprises an integrated circuit of the type generally designated 74C373, while digital-to-analog converter 442 comprises an integrated circuit of the type generally designated MC1408L-8. A reference voltage is provided at a suitable control input of digital-to-analog converter 442 from an operational amplifier 450, via a variable resistor 452. The non-inverting input of OP AMP 450 is fed from the junction of the series combination of a variable resistor 454 with a fixed resistor 456, running between a suitable voltage supply and ground. A capacitor 458 is connected in parallel with resistor 456. The inverting input of OP AMP 450 receives a feedback signal from its output. The output of D to A converter 442 feeds the inverting input of the OP AMP 436 whose output, it will be remembered, feeds the common signal to the comparators 428 and 430. A suitable feed back resistor 460 is provided between the output and inverting input of OP AMP 436 and its non-inverting input is tied to ground.

Figure 6:
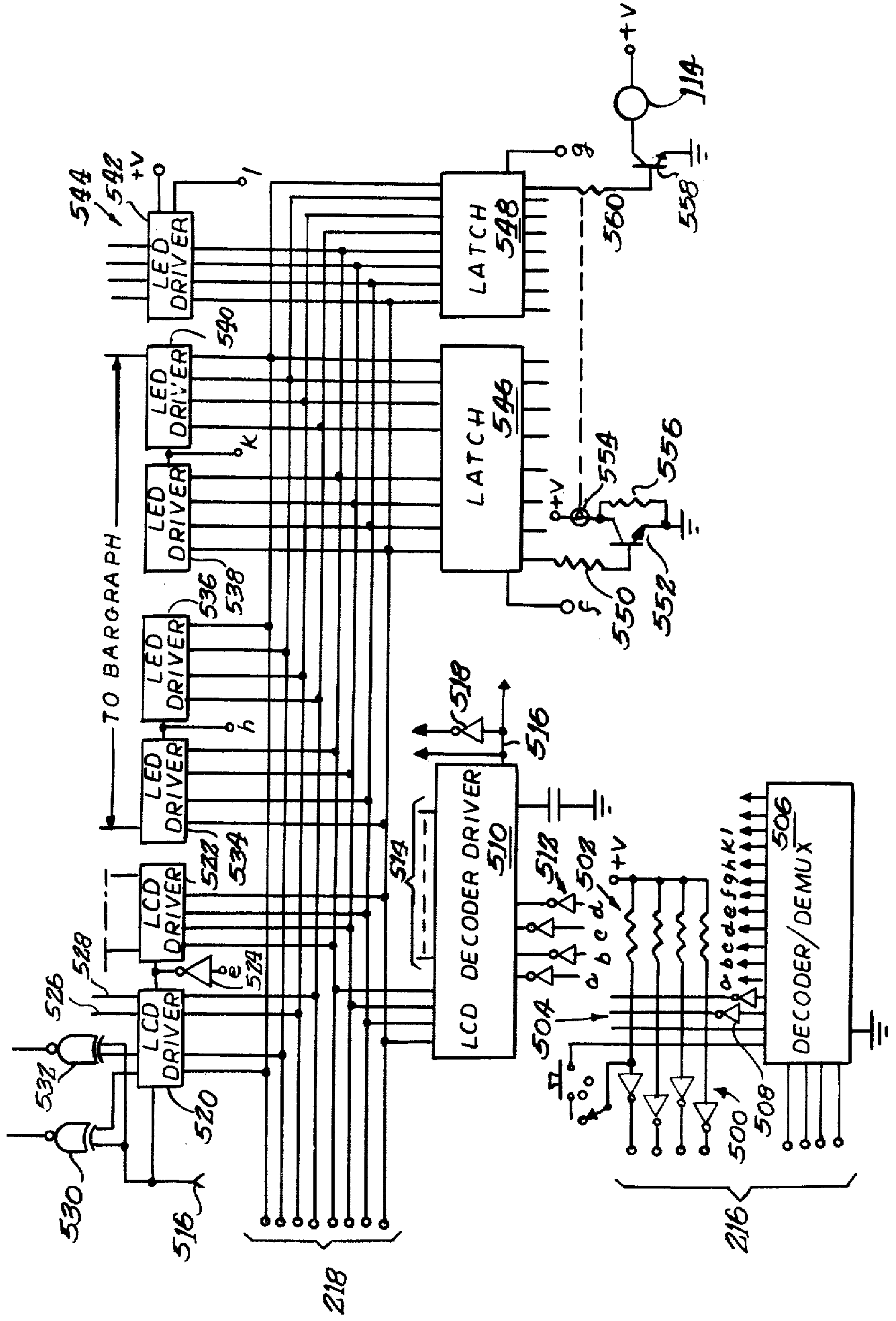
FIG. 6 is a further circuit schematic of yet another portion of the monitoring circuit of the invention.

Referring now to FIG. 6, a display driver and control interface circuit for interfacing between the microprocessor 102 and display and control panel 104 of the present invention is illustrated in detail. Referring initially to the left-hand portion of FIG. 6, input/output (I/O) terminals of the circuit of FIG. 6 are joined with the terminals of the I/O ports 216 and 218 of the CPU 200 of FIG. 4. These terminals are joined in the same order, top-to-bottom, to the like-designated terminals illustrated in FIG. 4.

The top-most four of the terminals of port 216, as illustrated in FIG. 6, are joined to the respective outputs of four buffers, designated generally 500. The inputs of the buffers 500 are provided with suitable pull-up resistors, designated generally 502, from a positivge voltage source. The control keys 116 through 144, inclusive, and key operated switch 146 of the display and control panel 104 of FIG. 3 are set at respective junction points of a matrix designated generally 504. Accordingly, depression of any of these key control switches causes a corresponding cross over point in matrix 504 to be electrically joined as indicated in Table 1:

TABLE 1

| KEY MATRIX | | |
|---|---|---|
| COL | ROW | NAME |
| ϕ | 4 | PROG |
| ϕ | 5 | RUN HOLD |
| ϕ | 6 | TOTAL ACRES |
| ϕ | 7 | PRESS. |
| 1 | 4 | AUTO. SHUT DOWN |
| 1 | 5 | TIMER |
| 1 | 6 | ENG HOURS |
| 1 | 7 | TEMP |
| 2 | 4 | ALARM SET |
| 2 | 5 | DIST |
| 2 | 6 | TACH |
| 2 | 7 | GND SPEED |
| 3 | 4 | RESET |
| 3 | 5 | FIELD ACRES |
| 3 | 6 | LIMIT SW |
| 3 | 7 | GRAIN LOSS |

The horizontal lines of matrix 504 are the inputs of the buffers 500, while the vertical lines thereof are joined with the first four outputs of a decoder/demultiplexer circuit 506. The latter two of these vertical lines of the matrix 504 are fed via suitable inverter buffers designated generally 508. In the illustrated embodiment, the decoder/demultiplexer circuit 506 is an integrated circuit of the type generally designated 74C154. The four inputs of the decoder/demultiplexer 506 are fed from the bottom-most four terminals of the port 216. The remaining outputs of decoder/demultiplexer 506 feed other circuits of FIG. 6, as indicated by the like-lettered terminals a through 1.

The terminals a, b, c, and d of decoder/demultiplexer 506 feed inputs of a liquid crystal display (LCD) decoder-driver circuit 510 via suitable series connected inverter buffers designated generally 512. This decoder-driver 510 also receives four inputs, as indicated, from the I/O port 218. The outputs of the decoder-driver 510 drive the respective segments of the four right-most digital characters 108 of FIG. 3, as indicated generally at the bracket 514. In the illustrated embodiment, the decoder-driver 510 is an integrated circuit of the type generally designagted DF411, available from Siliconix Inc. A remaining output 516 of decoder/driver 510 feeds suitable control terminals of further LCD and LED driver components, and the LCD back planes of the LCD elements of display 104, directly and via a suitable inverter buffer 518, respectively.

The LCD and LED driver circuit components are illustrated along the top portion of FIG. 6. LCD drivers 520 and 522 receive inputs as illustrated from the terminals of the I/O port 218, and a control signal from the terminal e of decoder/demultiplexer 506, via a suitable inverter buffer 524. In the illustrated embodiment, the LCD driver 520 comprises an integrated circuit of the type generally designated 4054, while the LCD driver 522 comprises an integrated circuit of the type generally designated 4056. The LCD driver circuit 522 feeds the segments of the fifth or left-most digit 108 of the display of FIG. 3. The LCD driver circuit 520 feeds the colon and decimal point characters of the display 106 of FIG. 3, via its outputs 526 and 528, respectively. The remaining outputs of LCD driver 520 from one input to each of a pair of two-input exclusive-NOR gates 530 and 532. The output of the exclusive-NOR gate 530 feeds one of the message panels 112 of the display 104 of FIG. 3, while the exclusive-NOR gate 532 feeds the pointer or cursor 115 for the fifth or left-most digital character 108 of the display 104.

The LED segments of the sixteen segment bar graph 110 of FIG. 3 are fed from the respective outputs of four LED driver circuits 534, 536, 538, and 540, which in the illustrated embodiment are all LED driver circuits of the type generally designated 4035. The control terminal h from the decoder/demultiplexer 506 controls the LED drivers 534 and 536, while the control terminal k of decoder/demultiplexer 506 controls the LED drivers 538 and 540. The LED driver circuits 534, 536, 538 and 540 have their inputs joined to respective terminals of the port 218, as illustrated. A further LED driver circuit 542, also of the type 4035, has four outputs, designated generally 544 which feed the four pointers or cursors 115 associated with the remaining four digits 108 of the display illustrated in FIG. 3. This LED driver circuit 542 also receives a suitable control input 1 from the decoder/demultiplexer 506 and is joined with terminals of the port 218 as illustrated.

The port 218 is also joined with input terminals of a pair of latch circuits 546 and 548, which in the illustrated embodiment are integrated circuits of the type generally designated SN74LS273. The outputs of these latch circuits control energization of the lamps for selectively back lighting the key switches 116 through 144, inclusive, of the control panel of FIG. 3. Each of these driver circuits is identical, whereby only one such circuit is illustrated in detail. This circuit comprises a resistor 550 which feeds an associated output of one of the latches 546 and 548 to the base electrode of a transistor 552, whose collector electrode is connected for sinking a current through lamp 554 which forms one of the lamps for the control key switches. The emitter electrode of transistor 552 is joined with ground and a suitable biasing resistor 556 is joined between the collector and emitter electrodes thereof. The last output of latch 548 drives a circuit for selectively energizing the alarm 114. The alarm 114 is interposed between a suitable source of positive voltage and the collector electrode of a transistor 558 whose emitter electrode is joined with ground. The base electrode of transistor 558 is fed from the last output of latch 548 via a suitable series connected resistor 560. Control terminals f and g of the decoder/demultiplexer 506 are joined with suitable control terminals of latches 546 and 548, respectively.

Figure 7:
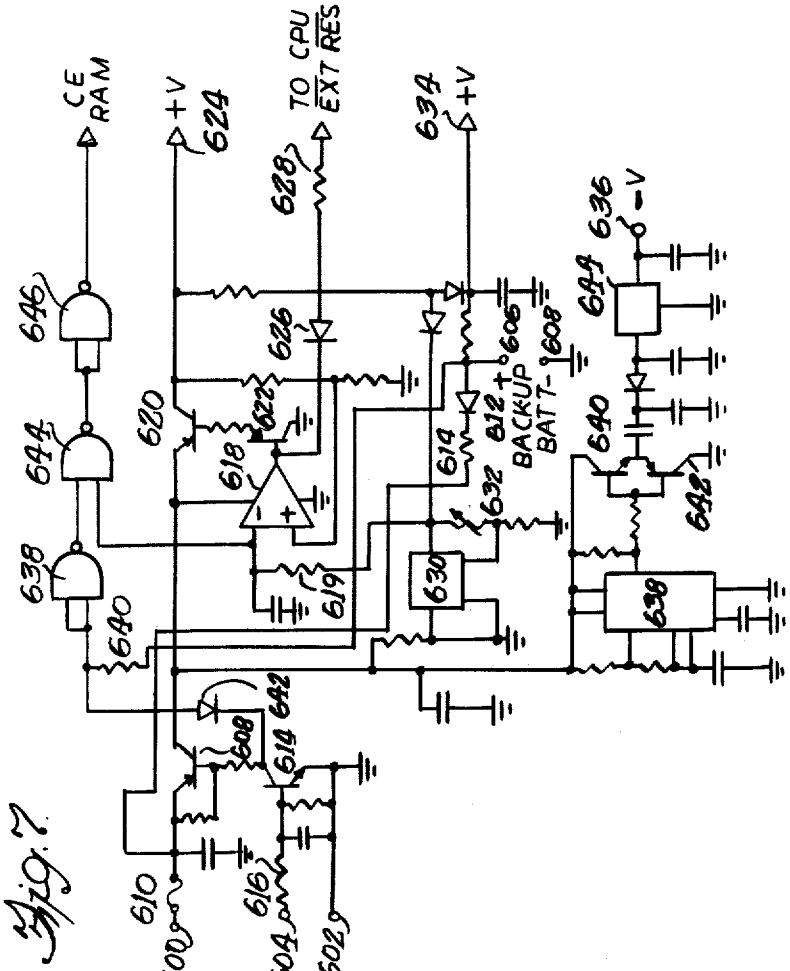
FIG. 7 is a circuit schematic of a suitable power supply circuit for the monitoring circuit of the invention.

Referring now to FIG. 7, a power supply for the circuits of the invention is illustrated in detail. Positive and negative battery terminals of the combine battery, or tractor battery, in the case of a tractor-pulled type of combine, are joined to terminals 600 and 602, respectively. An ignition switch lead feeds terminal 604. A back-up battery (not shown) is joined across terminals 606 and 608, to provide back up power for maintaining contents of the volatile memories, previously illustrated, in the event of power failure or other power shut-down of the vehicle battery. Terminal 600 feeds the emitter electrode of a transistor 608 via a suitable fuse 610. Terminal 606 feeds the same point via a suitable series connected combination of a diode 612 with a resistor 614. Terminal 602 is ground while terminal 604 feeds the base of a transistor 614 via a series connected resistor 616. A suitable parallel connected RC network joins the base of transistor 614 to its emitter at ground. The collector of transistor 614 is joined via a series connected resistor to the base of transistor 608, which has a further resistor joining its emitter electrode to its base electrode and a suitable grounded capacitor joined with its emitter electrode. The collector electrode of transistor 608 feeds the inputs of a voltage regulation circuit.

The voltage regulation circuit includes an operational amplifier 618. The OP AMP 618 has its inverting input fed from a voltage regulator integrated circuit 630 via a series connected resistor 619. The OP AMP 618 feeds a pair of PNP transistors 620 and 622 and associated network of passive components for providing a suitable control signal via a diode 626 and series connected resistor 628 to feed the $\overline{\text{EXT RES}}$ terminal of the CPU 200 of FIG. 4. The voltage regulator integrated circuit 630 in the illustrated embodiment is of the type generally designated 78GUIC. This regulator 630 outputs an adjustable regulated voltage by setting of a suitable potentiometer 632 to provide regulated positive supply voltages at output terminals 624 and 634. The voltage regulation circuit also provides a suitable negative supply voltage at an output terminal 636. The negative regulated voltage supply network includes a timer integrated circuit 638, an NPN transistor 640, a PNP transistor 642, and a negative voltage regulator integrated circuit 644. In the illustrated embodiment the timer integrated circuit 638 is of the type generally designated 555 while the negative voltage regulator integrated circuit 644 is of the type generally designated 7905. Suitable additional passive components are included in circuit with the above-described components for providing a suitable regulated negative voltage at output terminal 636.

A suitable control signal for the CE RAM line of FIG. 4 is provided at the like-designated output of the circuit of FIG. 7. A NAND gate 638 is joined to the collector electrode of the transistor 614 via a diode 642 and to the terminal 606 via a resistor 640. The NAND gate 638 feeds one input of A NAND gate 644 whose opposite input is fed from the inverting input of the OP AMP 618. The NAND gate 644 feeds both inputs of a further NAND gate 646 whose output is the CE RAM line.

In order to fully describe the illustrated embodiment of the invention, an exemplary program for the microprocessor 102 is reproduced on the following pages. This program is machine language format. The obliterated lines represent errors in the machine print-out of the program and may be disregarded.

:210000002718C202E3D70EEB059BA8818B12A20F51116217F10172813 5D7251B0280E9D7050AP
:21002100341 1F250C94F474B9A8738 1027B241057576F705E8FFE676A72155C70635C2A20E80E
:2100420017171717171 72A203F172A20BF17172A200063 6A7E537050795128 0A66738E4C1F6A
:2100630025C250794F32A20687853705C7451280A664C1F5C250394F5431F250C84EC2A208446
:2100840027A53705C7351280A6643250A94072A20C87890EE250894072A20B87990E4250994D5
:2100A500072A201E7490DA2504940 72A20F87590D02A20F27D537251280A667F132A0F7685 1C
:2100C600180 2A278532813267F5444182410 2A0F7613 8E280EA27253281326 3494ED20995 0A6
:2100E700 51795228 06ED40245F5051745328132632 81F12010536 66D7018 5D5C281301 2022 0A
:100108005133 34FE3194F96D70CC94036E4C133391E94721EC577E542A2F93228 0 2D810

:2101260020FEBF730E2908D590A636B5D495C1E20673D81566370 5D5E674015638108 2A2005
:21014700EA165D165E2A20E840B5D40B5E47121581552A20EC674C21016394 0B1618FC5D50
:210168001618FC5E90074C8B5D408B5E674C21026394192A20E8162A20EC8A18FC5D152A202F
:210109 00E98A18FC5E901F6F905C2A20E840B66F5C2A20E06D4C8B6FFC6D5D4D8B5E3A20C97A
:2101AA004D8BFE5E4D18B176B070B04E18B175B07008674C1F15145E21017F5E9409 2A20BEE
:2101CB0040174117421 7E16F4E178FFD6B634D174D1720 0E674C2A0F488E0828125D150416E9
:2101EC00950C70CC911 6636D735C4C240CB09001A0141594123C81F3676F5C636C2C1D4E5992
:21020D004C08491E1C6F5E735D70CE91053C1381FD6F5E4E1313CD2A0F969E70889106F5CCC
:21022E0067EC1391D5634C675C94CF22C05C634C132A0F768E708840A2A20E3882A20E39 0CC
:21024F009162A20E93B2A20E91790A06F4E3C9104139 4BA6D909C2A205B1650165116522 9A0
:21027000126D1A0920 0F2C616F165E8FFD1D160E162C1B1C1A08656F4E88A91391FD7815595 1
:21029100A91381FD70B8A85C70694D1B0C08472102944C2A0F764C1514138E1170888 40A2A71
:2102B200 20F6882A20F690091 62A20F78B2A20F7174712159128472210574D22D05E4C146320
:2102D300 6A5C10900208708 8840A2A20E88B2A20E69009162A20E98B2A20E9170 067 6C7C0CB7
:2102F40047151381 2F281000 0C28F1840C2AF3F260E40C200C58F1240C5AF45260240C 0074
:110315000 8270EA0C5AF0925082B676E785C28029EF4

:2103260028290266656F20245C28028452280384517F5028100022E0F8CF3640CC2B755820 50
:21034700 3EC4941E281000 30CF40CF2B4715810828100 0AF45240528100 0AF422602 40CF2B89
:210368000745B280EC4941A2A20DC11161F25388102701017810B11161F2563810270101 7475C
:20038900131391 4B281000 00CCC0DECEFD49E22B765E280EC4941C281000 30D2400 2AF00D2

:2103A9002E1340D209D58F0040D5AF3926074 0D52403281000 00E280EE40EEAF12260E40EE45
:2103CA0000D88F1240D8AF45260240D82B290266281000 00CCCF1840B12B2A208F16588E4072
:2103EB00174117421773CB25219402702A208F1728100 0A0B426082B676E7A5C28029E2B70EC
:21040C00E87215B9A82A20F16368178C5D8A5E4C1370B981062813 4A6368472 1DF574C218057
:21042D001212C7577 75D70CE940629026 63C1381FD 15240D676E5C28029E90EE666A721502
:10044E005C6C5D20F95D7058 2420656F5C2802841

:21045E005228028451 7F50666D77CC5C6B240A5C2810002240E2103440E52723AF3C26024074
:21047F00E500E2E0E5CF3040E2F032AF1B29AF09250A1032CF2480E22323240200E25032B399
:2104A00003429B334260F00E5270B2B4815240E676E5C28029E2B481F25039 49A281000000ACE
:2104C1009017802 42B4721FB5770C1478404240457290266735865 6F20235C280284527F909D
:1F04E200092 40C656F5C705277506 66D77CC5C6B240A5C280284512810002 2F034CF3026

:21050100 40E2103440E52717 00E2F032AF1B29AF09250A1032CF2480E22323240200E25032C6
:21052200E09AF334AF1B29B334260F00E5270B2B4815240E676E5C29029E2B481F5825079424
:21054300A02902 66666E715C900D666E4C1F25038102715C4813581391E82A2063159 4042AAE
:21056400207 24C1313C08E1650116 6C4A5D4B5D2A13942577820420368E11408E6570517 82C
:21058500155CC119B87859 70B9B87813B9A8F894044CC1514C125C94EA4118881040820 51364
:2105A6001F900213131324068E666B165E8FFD6B2A20E24E174E1770174E174C1770175218 20
:2105C7005028100022C05280E540E260342B482138418402181881196 66E4C1524FC675C489F
:2105E800213894023C28029E79F8840428134A666E4C636AEC9415482138512810002706 00A8
:210609 0E240882404002240 662B29054D2A208F162490666D5E72155C656F20145C28028487
:21062A00517750705228100022 40E21034270E00E2F03440E200BFCF2480E2232340BFE0BBC4
:21064B002B666D70185D5E40250081 1C2504810275182408504112309 4FD516D70CC94036E83
:14066C004C135C3194F528130 14C1F820867 6E795C28029E62

:210660002902 66472101 94F967684D2A20F6188A4E9405188A84072A0F942802D82A20F61698
:2106A1005D165EC0199405472 1EF572A20EC4D174C172A20F67017177E80A047810522809 9 3
:2106C200031 3125790B92A20DC2806DE502806DE5120205 2280B6128 0EDC90EB0870561636A
:2106E30024F681FC240A5246181 5C20C20D70720CF5B280AEA280EDC471591F1280FF3CF0C45
:2107040010 67E2106810106930 10E9B0106CC0106D00106D70106DA0106F60106F90107000 15C
:21072500 2B20E690E920E60720D55B280AEA280EDC471591F1280FF3CF0F2B90E920 D5 5B20A2
:210746 00D707280AEA471591FA280FF3CF0F2B90F220C55B20D70728 0AEA90FC4C1F2107242 0
:21076700FC5C13CC1313CC24FD90E82A20F511CC715C841616542118240825108102 70524 4C5
:210788002 1E7C2101728135D101621181 3141F25038102715270515 0280B6190EC20815E208
:0C07A900D707280AEA471591FA280FF354

:2107940 0CF1E2B90F24C1F25038102715C20D70743250C842A208 65E280AEA4715911 2280F54
:1807B500F3AF2ACF15AF2D25020EFA8F2D24 0B28 0FF3AF3325020EFA4B

:2107CD00 0F332B90D020E85B280AEA471591C6280FF3CF032B20E690BE4C21071F5C2A20F117
:2107EE00281333522 80B6190F50828125D28137E7F0667684C21BF5C40251091 0925FC811019
:21080F0 270C181194C22405C0F1650165190077050510F728E165228126D0C2A20897 01717D5
:210830001 7171717560F728E1621108404461F567018C09109281000CF062B90F125FB910A00
:21085100281000CF272B3690E7281000CF27270C2B7055C0940E3628100 0CF272B70551 8C0A1
:210872009115420252 4119C1514581021FC555411312513094ED2A208946 8E45173681D72AD9
:210893000889162505811416 1F557018 8E451725 0A940870188E701790EE75550F3516158427
:2108B400 995911E70188E161494F22A208E7088940735 71188E90F770C591065 768290013 5A
:1408D5002A208A1655161 5C5501 6351 615C55116522 6294 0B

:2108E90028136D000828125D676E4E181AB172B070B01B6070CC15149409630C6094057F30A3
:21092A0002700E181AB177B070B01E4C14181AB10A1318240EB01B280E9D70B04E1514181A39
:21093B000810A2102240E01B280E9D70B0001284DA28126D0C0000F728E42151452AF14150C3F0
:21094C0005000828125D2807F728099F2A20934017411742151417745617705031521717289F9
:21095D00137E2A20334612BE4621011684021415122A20801720100000F278008235681E37281
:21098E0005F6E161215810728100CEF272B28126D0C008281350472202577F06290A3D200940F3
:1D09AF000280BED745628137E2813149115401381043694F2775628060AF36280DAF2F
:2109C0007050090E32507846725068433250151D13B40E471391CA280EB1900525029415438A8
:2109E0002505841047139IEF6E4021BF5C7052515090E46D4021205028126D0C480F128E067E
:210A0E004021014C840E8C144C841124109034141590D8B0154084F81F90281514SC4824F432
:210A2F009404 1F9483471381D290AD308105280A53676B485671900213368 1FD564C21E0C6E9
:210A5000050390E60875583 60F48128E46210116940215148 4F2008703 8319 4FD881F9480 30E2
:210A710067087015504354132A007768E16202A20EC1720162C1773BE290E2D0628125D7F5CA8
:210A9200200AF2010565 76F4C13910A7256280DAF28126D0028137E3694E07256203BAF2865
:210AB300126 870180008281 25D4024FA84071F84041F941D43132A0F768E7083940B162A3081
:210AD400CB002A20EB90082A20EA6C2A20EA17280EB128126000828125D28131491122807 58
:040AF500F72803EDE9

:210AF900281 37E281360 28126D0044250381384721010407280EB129000A44E3840F4012157 3
:210B1A009105602A7050435628 0EAF7356280BAF28126D2A0F58445313 8E1604160 5536F7060
:212B3B000515200940628 0A8890EA250284 3E4A0440052 8125D6B4021 7F3E6370507152 34FF
:210B5C0054182 90D3808676B4021A05028125D2813143194250 8ED 908E2A0F3E4325039104 11
:120B7D00290E11138E16041605 0C280A0C81E82A0FC21A

:210B8F0043250891E0138E4D551658165610701717170684075E107017171745562 90AF9080C
:210BB0002A0F7646138E70889 40C162A20E9188A2A20E9170C2A20E8180A2A20E8170C2A2042
:210BD100F290042A20F3112813334655 20E307280 99F70C045109405188A90028B10172A20FE
:210BF200F2168818179043207290032063544C131300C45810162107 1F5020EC0728099F1047
:210C130030401788888181790 1F20F55B1016541312121450 20E00744219F5428099F4013E0
:210C3400150 41017281 35D90494C5B20F3240 D3B94FC5B251A20D4810320DA0728136C280980
:210C550045281 3754B251A91232813332813 6C4E1855280FF3AF3C2B2A20F570C181037056 80
:210C760016F5C62A20F51728135D79562813 8A9028205E5B20D707281 36C47159107280FF036
:060C97000CF212B28094EBD

:210C9D00471591 08200FF3EF21240 3280FF360DE3B905B20F85B20E907281360 28094E442550
:210CBE00029437280EB1280FF30F1B40F80EFA40CF2B2A20EA1622202A20EA17280FF300CF03
:0E0CDF00EF3628 2807F799

:210CE5002808ED28131481EE250584 0C56280BAF90E4280FF3240 7280FF300CFEF3660F80FD3
:210D0600 3E40CF2B71562806AF36280BAF636A3C810370504721BD5728126D005A015B290E05
:1A0D270008 28131481FC250284 1D25008404290E1143250781F9132A0FAC45

:210D41006E16041605472242576 36A0C290E1620C65B20D707281 36C28094E263FF360C82BC3
:210D62000A720B45B200D072813 6C47159107280FF3CF1E2B28094E4715910 8280FF3EF1E7E
:1F0D83001 40 3280FF360B42E 90D64C13130C24735B28136C471520D75109280FF3CF039B

:210DA20020 5607280 94E47159107280FF3EF0 2B28137 53E745628138A30CE4C13130C2404
:210DC300245B20D707281 36C47159109280FF3AF2ACF152B28094E47159 1D6280FF3EF158FA4
:1E0DE4002A2B 0CC636A4C130C13130C24FD5 8281 36C20F9CB5B4025038107280FF3CE

:210E020 0E00A2B28137520FDCB5E7956281 38A4354290D0A280A3C81F7432 50E840 9250994A1
:210E2300EE2A208F161F8E248E600F5E7088842420145C656F20145C1A280 2841B2532911 3D
:210E4400330FF300EF20040F1BF015232360E82B906C676E4C22805C2810000EFA24EE4013A0
:210E6500C013130C24F956281 36C4C2503910920D707280 94E901320EF07280FF3CF3328280C
:050E86009 4E280FF3E6

:210E8B00 EF330228137520 9A0B5E7956281 38A29 0D0A03A7A7A70C161 8B176B070B016186138
:210EAC0 7520700B01C0828125D676F4C1391FD44562808AF28126D0C082A0F7648138E708898
:210ECD0084062A20EA9005162A20EB188B180C0828125D435B280EC42A0F767394081 38E26E1
:210EEE0002D890055628 0BAF28126D000000EE4031FD4000FD468DFD6667FF4CC8FF4E07EC
:210F0F00FF679A00400004710005745014000166FF0251470260000450000640000 65000EF
:1E0F30000673000764000A42000A7CFC0A7D0008708 00C66840E4E1E02F0032A03DAFE

:160F4E00044A04D505470616008 30B750D280A8C0AB806080EEFA5

:210F640007030721073607510784079907990 7E607410100020003400030010002000400080A0
:210F8500000090100400020001000080000400020000 90A0B0C0D0E0F07060504030201800003
:040FA60 0C370C80F8

:163FA8003E110E110E110C100E110BFD0BF908CF0C300D500E11E1

[redacted]

```
:210FC0000D640DBE0D8D08D40E63DB00CFCCD5D2D8EEC5C299190099990099030093909100345
:110FE1000000010000999910999909060000990000E2
:0D0FF30008676D71FC94FE71FC94FD900286
```

[redacted]

```
:21100000062584A5D4B5D435D445D455D465D475D900428126D015B1F05005A1904101657D5
:21102100121581 0E161F0B47210FCC5E584C5A900B4715149403721 55A165B10700BC7910F30
:2110420013911313810A12154754811090036C165D165D165D011F05001904281 25D2A107005
:2010630004714121 38E16041C0570575 30C101312981284127E10831080 10DD116728123E11
```

[redacted]

```
:21108300C194094450455146529038 70C5848244181FC0841D5B8103181F5A250F912A70CBB3
:2110A400310928120 03A94FE900728121F3A94FB2812002812 1F47C353461 9C25245190 15112
:2110C500281 1C229101344181FC09803810381F44453455146529 0EC281131636842 5D465A42
:2110E6000811125341685D281 1124EC3534C1957455A425D2811124EC3534C19C757415D28A4
:0211070011 12C3
```

[redacted]

```
:211109004EC7524C195129118408705E785B4CCC5D92124CCC5E4C195D4CCA5E4C195C3B94BC
:21112A00EE5D0C4CCC90F408281 25D79C17081052812477162 6F5C70C5810928123E626F7153
:2111 4B00CC5C28126D40C4981 18109207F505120FF9004705051 52905C1F500C44181F5423C9
:21116C0011 3170C584E528123E7F5B70575A6368900942C2524119C1514A135A47C7574A196B
:21118D005A46C25C4519C192075 14C52471F573B94E042C2524119C15146C24519C192047879
:1811AE0015534A514752281 1C2626F3C9404281242291 01308281 25D86
```

[redacted]

```
:2111C6004113940 8C29408C394055051 9029705A57C18116281247715790 0F5142C25241199F
:2111E70051 43C3534219529A411381EF40CA503794042 8124228126D0C0843125342151215 0C
:2112080C3534212524115121 5C2524112512140 13C151710 0500C094712574615121 5C75769
:211229004612564515121 5C6564512552140 13C55571C4540C086D900808697290040869 7322
:21124A005B60900 25D4C183B94FB90024C1F5E82FC700C1A676A4C0B005D015C0A1F676A5C04
:21126B001B1C1A676A7018CC0B4E054C040A676A5C1B1C40C1C21853715710A92101 84FC403F
:21128C0017411742173794 4C4317904844151 42A12F48E160570C10C810B2812004113125130
:2112AD00401F502811C2902881109027309024940990208405901C811A28126D01CB050019E1
:2112CE00470CB81050024FF04291016810428124729101362684D5A4D5B4D534D544D554D29
:0612EF00564D5728126D58
```

[redacted]

```
:0C12F5000CA4B9C6E5C4C0BCDADCE2BC75
```

[redacted]

```
:2113010026D4D1AB174501B70B04C1AB173B01B70B90C08676F701ACC81091E13125C15 14D0
:211322005 41D100C20325638 94FE3694FB3394F51C08636A4C52557190021 33594FD568A700F
:211343008402715070510C0870C781FB676B4C22205C2A20F5162280900 6032A20F516181AE2
:21136400B272E970B9B8150C08101550165116526C0810401741174217 0C0867ED71FC94FE1D
:21138500 71FC84FD0C081070883694FD18170C46000000000000099F094007AC0252000 00000F7
:2113A6000000000000000000000000000000000000000000000000000000000000000000000002E
:2113C70000000000000000000000000000000000000000000000000000000000000000000000000
:1813E800000000000000000000000000000000000000000000000000000ED
```

[redacted]

While preferred embodiments of the invention have been illustrated and described herein the invention is not limited thereto. On the contrary, various modifications, changes and alternatives may occur to those skilled in the art, and the invention includes such changes, modifications and alternatives insofar as they fall within the spirit and scope of the appended claims.

The invention is claimed as follows:

1. A combine performance monitor for a combine having a plurality of sensor means for detecting a plurality of different operating conditions of the combine and for providing sensor signals corresponding to said conditions, said combine performance monitor comprising: display means, operator accessible control and selection means and a programmable special purpose computer including means for storing a predetermined computer program, said computer being coupled to said sensor means, to said control and selection means and to said display means for calculating a plurality of values of predetermined combine functions related to combine performance in accordance with said sensor signals and with said predetermined program and for selectively energizing said display means to provide observable indications of said values, said operator accessible control and selection means and said special purpose computer including cooperating customizing means for selectively modifying said predetermined computer program in accordance with combine operating characteristics so as to customize said combine performance monitor for operation with any one of a plurality of combines having different operating characteristics.

2. A combine performance monitor according to claim 1 wherein said customizing means includes means in said special purpose computer responsive to said operator control and selection means and coupled to said means for storing said predetermined program for selectively modifying said predetermined computer program in accordance with the operating characteristics of a particular combine selected from among said plurality of combines.

3. A combine performance monitor according to claim 1 wherein said customizing means further includes means for selectively modifying said predetermined computer program in accordance with the operating characteristics of the particular sensor means associated with a particular combine selected from among said plurality of combines.

4. A combine performance monitor according to claim 1 or claim 3 wherein said customizing means further includes means for selectively modifying said predetermined computer program in accordance with one of a plurality of different grains to be harvested by said combine.

5. A combine performance monitor according to claim 2 wherein said customizing means further includes means in said operator control and selection means for selectively entering into said special purpose computer a plurality of predetermined constants corresponding to selected operating characteristics of the particular combine with which said performance monitor is being used and corresponding to selected operating characteristics of the particular sensor means associated with said comine, said modifying means in said special purpose computer being responsive to said entry of constants for modifying said predetermined program in accordance with said predetermined constants.

6. A combine performance monitor according to claim 5 wherein said special purpose computer includes interfacing means for interfacing with sensor means including a plurality of tachometer means for detecting revolution rates of revolving components of said combine and providing signals corresponding thereto, a plurality of limit sensor means each capable of producing a first output state and a second output state and responsive to preselected structures of said combine for producing said first output state in response to a first condition of the associated structure and producing said second output state in response to a second condition of said associated structure, ground speed sensor means for producing a predetermined number of pulses per linear distance traveled by said combine and a plurality of temperature sensor means and pressure sensor means for detecting the temperature and pressure at predetermined parts of said combine and providing signals corresponding respectively thereto, and wherein said special purpose computer includes second interfacing means for interfacing with said operator accessible control and selection means to receive said constants, including constants corresponding to the types of signals produced by said tachometer means in response to the revolving components, constants corresponding to the conditions of said structures with which said limit sensor first and second output states are associated, a constant corresponding to a header width of said particular combine, a constant corresponding to the number of pulses produced by said ground speed sensor for a predetermined distance traveled by said particular combine and constants corresponding to the temperature response characteristic of each of said temperature sensors and to the pressure response characteristic of each of said pressure sensors.

7. A combine performance monitor according to claim 2 further including alarm means for producing an observable indication, said customizing means further including means in said operator control and selection means for entering into said special purpose computer alarm constants corresponding to predetermined values of said sensor signals from preselected ones of said sensor means in response to which said alarm means are to be actuated and means in said special purpose computer for modifying said program in accordance with said alarm constants and further means in said special purpose computer responsive to said predetermined values of said sensor signals and to said alarm constants for actuating said alarm means.

8. A combine performance monitor according to claim 7 wherein said special purpose computer includes means for interfacing with sensor means including a plurality of tachometer means associated with selected rotatable structures of said combine for producing tachometer signals corresponding to the rotational speed thereof, ground speed sensor means for producing ground speed signals corresponding to the rate of travel of said combine, engine timing means responsive to operation of an engine of said combine for producing engine hours signals corresponding to the cumulative hours of operation of said engine, grain loss sensor means responsive to the rate of grain loss from said combine when in operation for producing a grain loss signal corresponding thereto, a plurality of limit sensor means each capable of producing a first output state and a second output state in response to corresponding first and a second conditions of an associated structure in said combine, temperature sensor means associated with predetermined structures in said combine for producing temperature signals corresponding to the temperatures thereat and pressure sensor means associated with predetermined structures in said combine for providing pressure signals corresponding to the pressure thereat and wherein said special purpose computer includes means for receiving said alarm constants, including alarm constants corresponding to predetermined signal levels of each of said tachometer signals, of said ground speed signals, of said engine hours signals, of said grain loss signals, of said temperature signals and of said pressure signals at which said alarm means is to be actuated, and corresponding to a predetermined one of said first and second output states of each of said limit sensor means at which said alarm means is to be actuated.

9. A combine performance monitor according to claim 1 wherein said customizing means further includes means for selectively modifying said predetermined computer program in accordance with the nominal operating values of the structures of a particular combine associated with preselected ones of said sensor means, said particular combine being selected from among said plurality of combines.

10. A combine performance monitor according to claim 9 wheren said special purpose computer includes means for interfacing with sensor means including a plurality of tachometer means responsive to selected rotatable structures of said combine for providing tachometer signals corresponding to the rotation rates thereof and grain loss sensor means responsive to loss of grain from said combine when in operation for producing a grain loss signal corresponding thereto and wherein said modifying means includes means for modifying said program in accordance with the nominal rotation rate of the structure associated with each of said tachometers and in accordance with a preselected maximum acceptable level of grain loss.

11. A combine performance monitor for monitoring the operation of structures in a combine including structures for threshing, separating and cleaning, said combine being provided with a plurality of sensor means for detecting a plurality of different operating conditions of said combine structures and for providing sensor signals corresponding to said conditions, said combine performance monitor comprising: display means for producing observable indications of values of functions being monitored, operator accessible control and selection means for control of the performance monitor and for selection of functions to be displayed on said display means, a special purpose computer including means for storing a predetermined program, said computer being coupled to said sensor means, to said control and selection means and to said display means for calculating a predetermined plurality of values related to combine performance in accordance with said sensor signals and for selectively energizing said display means to provide observable indications of said values in accordance with said program and with operator actuation of said operator accessible control and selection means, and customizing means in said special purpose computer and in said operator control and selection means and coupled to said means for storing said predetermined program, for selectively modifying said predetermined program to customize said combine performance monitor for operation with any one of a plurality of combines having different operating characteristics.

12. A combine performance monitor according to claim 11 wherein said customizing means further include means for selectively modifying said predetermined program to customize said combine performance monitor for operation with the particular sensor means associated with said one combine.

13. A combine performance monitor according to claim 11 or claim 12 wherein said customizing means further includes means for selectively modifying said predetermined program to customize said combine performance monitor for operation with a particular type of grain to be harvested by said one combine.

14. A combine performance monitor according to claim 11 wherein said customizing means further includes means for selectively modifying said predetermined program to customize said combine performance monitor in accordance with the nominal operating values of the structures of said one combine associated with preselected ones of said sensor means.

15. A combine performance monitor for use with a combine having a plurality of sensor means for detecting a plurality of different operating conditions of said combine and providing sensor signals corresponding to conditions, said combine performance monitor comprising: display means, operator accessible control and selection means and a programmable, special purpose computer including means for storing a predetermined computer program, said computer being coupled to said sensor means, to said control and selection means and to said display means for determining a predetermined plurality of values of combine functions and of combine performance in accordance with said sensor signals and for energizing said display means to provide observable indications of said values, said special purpose computer includes means responsive to operator actuation of said operator accessible control and selection means and coupled to said means for storing said predetermined program for modifying said predetermined program to customize said combine performance monitor for operation with a particular combine and with the plurality of sensor means associated with said particular combine, said particular combine being selected from a plurality of combines having different characteristics.

16. A combine performance monitor for a combine having a plurality of sensor means for detecting a plurality of different operating conditions of the combine, said combine performance monitor comprising: a programmable, special purpose computer including means for storing a predetermined computer program, operator accessible control and selection means and means in said special purpose computer responsive to said operator accessible control and selection means and coupled to said means for storing said predetermined computer program for modifying said predetermined program to customize said combine performance monitor for operation with a particular combine selected from a plurality of differently structured combines and with the plurality of sensor means associated therewith.

17. A combine performance monitor according to claim 15 or 16 further including alarm means and wherein said special purpose computer further includes means responsive to operator actuation of said operator accessible control and selection means and coupled to said means for storing said predetermined computer program for modifying said predetermined program so as to cause actuation of said alarm means in response to predetermined values of the signals from preselected ones of said sensor means, which values correspond to predetermined values of the associated operating conditions at which actuation of said alarm means is desired.

18. A combine performance monitor according to claim 15 or 16 further including means in said special purpose computer responsive to operator actuation of said operator accessible control and selection means for modifying said predetermined program to customize said combine performance monitor for operation in response to nominal operating values of the operating conditions of the combine associated with preselected ones of said plurality of sensor means.

* * * * *